United States Patent Office 2,978,460
Patented Apr. 4, 1961

2,978,460

THIOLACTONES AND METHOD OF PREPARATION

Paul D. Bartlett, Weston, and Bryce E. Tate, Cambridge, Mass., assignors to The B. F. Goodrich Company, New York, N.Y., a corporation of New York No Drawing. Filed Sept. 20, 1955, Ser. No. 535,518

8 Claims. (Cl. 260—332.3)

This invention relates to new compositions and to methods of their preparation and more particularly refers to beta- and gamma-thiolactones and to methods of preparing thiolactones by reacting beta- and gamma-halo acid halides with a metal sulfide under controlled moisture conditions.

Beta-thiopropiolactones or inner esters of beta-mercapto propionic acids, cannot be prepared by known methods of preparing beta-propiolactone because of the unavailability of thioformaldehyde.

Gamma-thiobutyrolactones can be prepared in low yields by slow distillation of a gamma-mercapto butyric acid. A much more simple and efficient method, however, is to employ gamma-halo acid halides and substantially anhydrous metal sulfide, to produce good yields of the gamma-thiolactones.

It is therefore an object of this invention to prepare beta - thiolactones, especially beta - thiopropiolactone, which is a new chemical compound.

Another object is the method of preparing beta- and gamma-thiolactones by reacting the corresponding beta- and gamma-halo acid halides with a metal sulfide containing a controlled degree of hydration.

Another object is the method of preparing beta-thiopropiolactones by reacting beta-bromo, beta-chloro and beta-iodo propionyl bromide, chloride and iodide with an alkali metal sulfide of a controlled degree of hydration under substantially anhydrous conditions in an inert solvent for the acid halide.

Still another object is the method of preparing gamma-thiolactones by reacting gamma-chloro, bromo, and iodo acid chloride, bromide and iodide with an alkali metal sulfide of a controlled degree of hydration in an inert, substantially anhydrous diluent.

The beta- and gamma-thiolactones of this invention have the generic structural formula

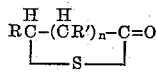

in which each R and R' is selected from the group consisting of hydrogen, aryl radicals and lower unsubstituted alkyl radicals and $n$ is an integer from 1 to 2. They are inner esters of beta- and gamma-mercapto carboxylic acids. The beta- and gamma-thiolactones can be reacted chemically with bone dry cotton linters to add sulfur containing side chains to cotton fiber. The thiolactones can also be used to prepare desirable derivatives, including, dicarboxamidoethyl disulfide and dicarboxamidopropyl disulfide.

As mentioned heretofore, the beta- and gamma-thiopropiolactones are prepared by reacting a beta- or gamma-halo acid halide with a metal sulfide of a controlled degree of hydration under substantially anhydrous conditions. The halo acid halides have the generic formula

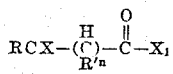

wherein X and $X_1$ each represents a halogen preferably iodine, bromine or chlorine, and R and R' represent hydrogen or a lower unsubstituted alkyl or aryl hydrocarbon radicals and $n$ is an integer from 1 to 2. X and $X_1$ can be further defined as a halogen having an atomic weight of at least 35.457 as shown in the periodic table of elements, Handbook of Chemistry and Physics, Chemical Rubber Publishing Company, 33rd edition, 1951–52, on page 339.

Among the specific beta-halo propionyl halides that can be used are the following: beta-bromo propionyl chloride, beta-chloro propionyl chloride, beta-bromo propionyl bromide, beta-chloro propionyl bromide, 2-methyl-3-bromo propionyl chloride, 2-ethyl-3-bromo propionyl bromide, 3-methyl-3-bromo propionyl chloride, 3-ethyl-3-bromo propionyl chloride, 2,3-dimethyl-3-bromo propionyl bromide, 2,3-dimethyl-3-bromo propionyl chloride, 2,3-diethyl-3-chloro propionyl chloride, 3-butyl-3-bromo propionyl chloride, 2-propyl-3-bromo propionyl chloride, 2-phenyl-3-bromo propionyl chloride, 3-phenyl-3-chloro propionyl bromide, beta-iodo propionyl chloride, beta-iodo propionyl bromide, beta-iodo propionyl iodide, beta-chloro propionyl iodide, beta-bromo propionyl iodide, 2-methyl-3-iodo propionyl chloride, 2-ethyl-3-iodo propionyl bromide, 3-methyl-3-iodo propionyl chloride, 3-ethyl-3-iodo propionyl bromide, 2,3-dimethyl-3-iodo propionyl bromide, 2,3-dimethyl-3-iodo propionyl chloride, 2,3-diethyl-3-iodo propionyl chloride, 3-butyl-3-iodo propionyl bromide, 2-phenyl-3-iodo propionyl chloride, 3-phenyl-3-iodo propionyl chloride and the corresponding gamma-halogenated derivatives of butyryl halides and substituted butyryl halides.

It is essential that the acid halide have a halogen atom on the beta- or gamma-carbon atom, and that the remaining substituents in the carbon chain be inert toward a metal sulfide.

The metal sulfides that can be used to prepare the thiolactones include ferrous and ferric sulfides, zinc sulfide, copper sulfide, calcium sulfide, magnesium sulfide, strontium sulfide, barium sulfide, sodium sulfide, potassium sulfide and lithium sulfide. The preferred sulfides are those of the alkali metals. The metal sulfides can contain from substantially 0 up to about 4 moles of combined water, or water of crystallization.

The reaction proceeds over a fairly wide range of temperatures namely, from about −10° C. to about 75° C. or higher. At the higher temperatures the reaction, because of its exothermic nature, is quite difficult to control. Accordingly, it is preferred to run the reaction at between about 0° C. and about 45° C. or the reflux temperature of $CS_2$. Usually external cooling will be necessary to maintain the preferred reaction temperature range.

A diluent in which the halo acid halide is soluble and which will not react with either the acid halide or the metal sulfide is desirable, but is not absolutely essential, as the reaction may be carried out at the melting temperature of the acid halide in the absence of any diluent. However, under the latter conditions dissipation of the heat of the reaction may be difficult and for that reason the reaction in the presence of a diluent is preferred. Suitable diluents include carbon disulfide, the liquid paraffin and liquid aromatic hydrocarbons.

The order of addition of ingredients is in no way controlling. Thus, the beta- or gamma-halo acid halide, either alone or in solution can be added to dry metal sulfide or a slurry thereof in a non-reactive diluent. The order of addition can be reversed by adding the sulfide to the acid halide or, if desired, the two ingredients can be fed simultaneously into a reactor either undiluted or with a diluent. The preferred method is to add, slowly, a solution of the beta- or gamma-halo acid chloride in an inert solvent to a slurry of the metal sulfide in an inert, substantially anhydrous liquid.

The ratio of ingredients entering into reaction is approximately 1:1, that is, one mole of beta- or gamma-halo acid halide reacts with one mole of metal sulfide to produce one mole of thiolactone, in accordance with the following formula:

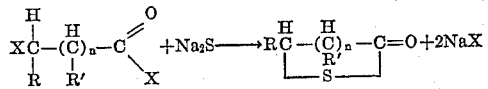

where R and n have the same designation as that given above, and X is a halogen selected from the group consisting of iodine, bromine and chlorine.

However, an excess of either reactant can be employed, but the yields are not improved appreciably thereby.

At a temperature of 0–10° C. the reaction is substantially complete in about 3 hours, and at higher temperatures a shorter period will suffice.

During the course of the reaction a metal halide is formed. If the reaction is carried out in a liquid organic diluent, any unreacted metal sulfides and the metal halides formed in the reaction are insoluble and can be removed by filtration, as the thiolactones are quite soluble in liquid hydrocarbon and carbon disulfide. If, on the other hand, the reaction is carried out without a diluent, the thiolactone and other organic ingredients that may be formed can be separated from the reaction mixture by dissolving the organic portions of the mixture in an organic solvent and leaving any unreacted sulfide and metal halide in suspension. The suspended solids can be removed by filtration, centrifuging, decantation or any other known method for separating solids from liquids.

The beta- and gamma-thiolactones can be recovered from solution by fractional distillation if they are low boiling types or by crystallization from a concentrated solution if they are solids at room temperature.

The following examples are intended to illustrate more fully the preparation of the beta-thiopropiolactones and gamma-butyrolactones of this invention, but are not to be construed as a limitation on the scope thereof, for there are, of course, numerous possible variations and modifications.

In the examples the parts are by weight unless otherwise indicated.

*Example I*

Substantially anhydrous sodium sulfide was prepared by heating $Na_2S \cdot 9H_2O$ in a vacuum oven at 100–150° C. to remove all but a small amount of the water in the salt. A slurry of 15.7 parts of the substantially anhydrous sodium sulfide was made with about 126 parts of carbon disulfide. A solution of 31.7 parts of beta-bromopropionyl chloride.

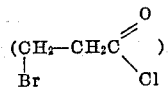

in 38 parts of carbon disulfide was added slowly to the sodium sulfide slurry, with vigorous stirring and external cooling in an ice bath. Stirring was continued for 3 additional hours. The sodium halides and excess sodium sulfide were removed by filtration. The carbon disulfide was then distilled under reduced pressure, after which the beta-thiopropiolactone was distilled at a temperature of 50–53° C. at 12 mm. pressure. The beta-thiopropiolactone had an $n_D^{20}$ of 1.5269 and a $d_4^{20}$ of 1.301. The yield was 44% of theory.

On analysis the beta-thiopropiolactone was shown to have the following elemental composition:

|  | C | H | S | O |
|---|---|---|---|---|
| Calculated for $C_3H_4OS$ | 40.89 | 4.58 | 36.36 | 18.16 |
| Found | 40.92 | 4.68 | 36.20 | [1]18.20 |

[1] (By difference.)

The molecular weight of beta-thiopropiolactone is calculated to be 88.12. A cryoscopic molecular weight determination of the product of this example gave a value of 84.3.

In carbon disulfide the infrared spectrum showed the carbonyl bond absorbing at 5.64 microns.

*Example II*

The procedure of Example I was followed, but the reaction was started at 0–5° C., warmed to room temperature and then refluxed, using a larger excess of substantially anhydrous sodium sulfide. No better yields of beta-thiopropiolactone resulted from the difference in the process.

*Example III*

To a slurry of 9.5 parts of substantially anhydrous $Na_2S$ and 126 parts of carbon disulfide, 15 parts of gamma-chlorobutyryl chloride in carbon disulfide solution were added at room temperature. The mixture, after several minutes of stirring began to warm and was immediately cooled in a bath of running water to a temperature slightly below that of the room. The mixture was stirred for six hours, allowed to stand over night and then refluxed with stirring for six hours. After removing solids by filtration, the carbon disulfide was distilled. The gamma-thiobutyrolactone distilled at 77–8° C. at 13 mm. pressure. It has an $n_D^{25}$ of 1.5177. The yield was 71%.

*Example IV*

To a slurry of 29 parts of substantially anhydrous sodium sulfide in 252 parts of carbon disulfide were added 44.5 parts of beta-chloropropionyl chloride. The reaction was run at ice-bath temperature for 3 hours. A yield of about 12% beta-thiopropiolactone was recovered.

*Example V*

Equimolar quantities of beta-chloropropionyl chloride and substantially anhydrous sodium sulfide were reacted at ice-bath temperature in carbon disulfide as a diluent. The temperature was held at 5–10° C. for 3 hours and then at room temperature over night. The additional reaction period did not improve the yield of beta-thiopropiolactone appreciably above 12%.

*Example VI*

Substantially anhydrous sulfide which was stored in a stoppered bottle for approximately six months was used to prepare thiopropiolactone in this example. A slurry of 62 parts of the sodium sulfide in 200 ml. of carbon disulfide was prepared and cooled to ice-bath temperature. Thereafter 90 parts of beta-iodo propionyl chloride in 75 ml. of carbon disulfide was added slowly to the sodium sulfide slurry. The mixture was stirred for 3 hours after completion of the addition of the beta-iodo propionyl chloride. The carbon disulfide was decanted from the mixture and then removed by distillation at reduced pressure. The liquid residue was then distilled at a pressure of 24 mm., and a temperature of 60 to 62°.5 C. The refractive index at 24° C. was 1.5271 and the density at 25° C. as related to water at the same temperature was 1.205. A 24% yield of the purified beta-thiopropiolactone was recovered.

It is possible to substitute any of the above enumerated beta-halo acid halides for those of the specific examples to produce beta-thiopropiolactones and gamma-thiobutyrolactones. Mixtures of beta-halo acid halides can be used to prepare beta-thiolactones and mixtures of gamma-halo acid halides can be used to prepare gamma-thiolactone.

Potassium or lithium sulfides or any of the other sulfides can be substituted in whole or in part for the sodium sulfide of the examples, if desired.

The reaction does not proceed in the presence of "free" or uncombined water, nor in the presence of large quantities of "combined" or water of crystallization. It is essential that the total moisture content of the reaction system, including the water bound in the crystalline salts be controlled, so that not more than about 4 moles of water of crystallization or hydration be present in the metal sulfide salt and preferably that the sulfide have only from about 0-3 mole of water of crystallization.

In all these reactions a polymeric solid is formed. The polymer apparently has the generic structure

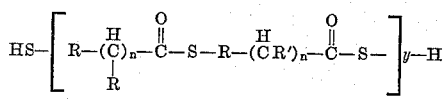

wherein R and $n$ have the same designation as above and $y$ has a value essentially greater than 1. This polymer, is either the result of polymerization of the thiolactone, or a condensation of the beta- or gamma-acid halide.

Although we have described the invention by specific examples, they are intended to explain, but not to limit the invention, except as restricted by the claims.

We claim:

1. A method of preparing compounds having the generic formula

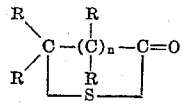

wherein each R is selected from the class consisting of hydrogen and, lower alkyl and $n$ is an integer of from 1 to 2, comprising reacting a compound having the generic formula

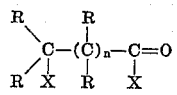

wherein $n$ and each R has the same designation as above and X represents a halogen having an atomic weight of at least 35.457, with an alkali metal sulfide having not more than 4 moles of water of crystallization at a temperature of from about −10 to about 75° C.

2. The method of claim 1 in which the reaction conditions and the metal sulfide are substantially anhydrous.

3. The method of claim 1 in which

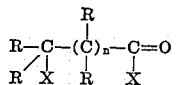

is beta-bromo propionyl chloride.

4. The method of claim 1 in which

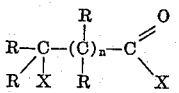

is gamma-chloro butyryl chloride.

5. The method of preparing beta-thiopropiolactone comprising reacting beta-bromopropionyl chloride with a substantially anhydrous alkali metal sulfide in the presence of a substantially anhydrous, inert diluent at a temperature of from about −10 to about 75° C.

6. The method of preparing gamma-thiobutyrolactone comprising reacting gamma-bromo-butyryl chloride with a substantially anhydrous alkali metal sulfide in the presence of a substantially anhydrous, inert diluent at a temperature of from about −10 to about 75° C.

7. The method of preparing beta-thiopropiolactone by reacting beta-chloropropionyl chloride with a substantially anhydrous alkali metal sulfide in the presence of a substantially anhydrous, inert diluent at a temperature of from about −10 to about 75° C.

8. The method of claim 5 in which the diluent is carbon disulfide.

References Cited in the file of this patent

UNITED STATES PATENTS 2,402,639    Lazier _____ June 25, 1946

OTHER REFERENCES

Bost: Ind. Eng. Chem. 23: 93–5 (1931).
Bost: Oil and Gas J. 32: (#3) 17 (1933).
Richter's Organic Chemistry Compounds, vol. 3, pp. 3 and 4 (1923 edition), Blakiston's Sons & Co., Philadelphia, Pa.